(12) United States Patent
Kishiki et al.

(10) Patent No.: US 7,049,041 B2
(45) Date of Patent: May 23, 2006

(54) RESIN FOR TONER BINDER AND TONER COMPOSITION

(75) Inventors: Hiroshi Kishiki, Kyoto (JP); Tomohisa Kato, Kyoto (JP); Naoki Takase, Kyoto (JP); Syuji Yamada, Kyoto (JP); Yoko Sakurai, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 3 days.

(21) Appl. No.: 10/475,716

(22) PCT Filed: Feb. 28, 2003

(86) PCT No.: PCT/JP03/02393

§ 371 (c)(1),
(2), (4) Date: Jul. 13, 2004

(87) PCT Pub. No.: WO03/073171

PCT Pub. Date: Apr. 9, 2003

(65) Prior Publication Data

US 2004/0241565 A1    Dec. 2, 2004

(30) Foreign Application Priority Data

Feb. 28, 2002  (JP)  ............... 2002-052978
Mar. 5, 2002   (JP)  ............... 2002-058511
Mar. 12, 2002  (JP)  ............... 2002-066409

(51) Int. Cl.
    G03G 9/00  (2006.01)
(52) U.S. Cl. ............ 430/109.4; 528/279; 528/283
(58) Field of Classification Search ............ 430/109.4; 528/279, 283
    See application file for complete search history.

(56) References Cited

U.S. PATENT DOCUMENTS

| | | |
|---|---|---|
| 3,067,178 A | 12/1962 | Greenberg et al. |
| 3,444,139 A | 5/1969 | Jeurissen et al. |
| 3,644,291 A | 2/1972 | Price et al. |
| 5,015,724 A | 5/1991 | Kawabe |
| 5,486,444 A | 1/1996 | Bayley et al. |
| 5,587,265 A | 12/1996 | Nakadera et al. |
| 6,007,958 A * | 12/1999 | Ito et al. ............ 430/109.4 |
| 6,413,691 B1 * | 7/2002 | Daimon et al. ............ 430/109.4 |

FOREIGN PATENT DOCUMENTS

| | | |
|---|---|---|
| EP | 0 291 059 A3 | 11/1988 |
| EP | 0 524 027 A2 | 1/1993 |
| EP | 0 640 884 A1 | 3/1995 |
| EP | 0 744 667 A2 | 11/1996 |
| EP | 0 974 870 A1 | 1/2000 |
| EP | 1 090 943 A2 | 4/2001 |
| GB | 1 284 658 A | 8/1972 |
| JP | 56-118418 | 9/1981 |
| JP | 5-230201 | 9/1993 |
| JP | 5-323664 | 12/1993 |
| JP | 6-248062 | 9/1994 |
| JP | 7-82355 | 3/1995 |
| JP | 7-114204 | 5/1995 |
| JP | 10-307419 | 11/1998 |
| JP | 10-316749 | 12/1998 |
| JP | 11-60703 | 3/1999 |
| JP | 2000-191758 | 7/2000 |
| JP | 2001-114887 | 4/2001 |
| JP | 2001-117268 | 4/2001 |
| JP | 2001-172373 | 6/2001 |
| JP | 2002-148867 | 5/2002 |
| WO | WO 90/10893 A | 9/1990 |
| WO | WO 03/052521 | 12/2002 |

OTHER PUBLICATIONS

Database WPI, Section Ch, Week 199209, XP002336779 & JP 04 012367A, Jan. 16, 1992.
Database WPI, Section Ch, Week 200109, XP002336780 & JP 2000 284538, Oct. 13, 2000.
Database WPI, Section Ch, Week 198734, XP002336781 & JP 62 146949A, Jun. 30, 1987.
Database WPI, Section Ch, Week 198011, XP002336782 & JP 55 016025A Feb. 4, 1980.

* cited by examiner

*Primary Examiner*—Mark A. Chapman
(74) *Attorney, Agent, or Firm*—Westerman, Hattori, Daniels & Adrian, LLP

(57) ABSTRACT

The present invention provides a toner binder for developing electrostatic charge images,
 which binder comprises a polycondensate polyester resin,
  said polyester resin being a product formed in the presence of at least one titanium-containing catalyst (A) selected from the group consisting of a titanium halides (A1), a titanium diketone enolate (A2), a titanium carboxylate (A3), a titanyl carboxylate (A4), and a titanyl carboxylate salt (A5).

Furthermore, the present invention provides a toner binder for developing electrostatic charge images,
 which binder comprises a polycondensate polyester resin,
  said polyester resin being a product formed in the presence of at least one tin-containing catalyst (B) selected from the group consisting of dioctyltin oxide (B1), monobutyltin oxide (B2), and dibutyltin oxide (B3), with the content of tributyltin compounds in (B3) being not more than 250 ppm.

14 Claims, No Drawings

RESIN FOR TONER BINDER AND TONER COMPOSITION

TECHNICAL FIELD

The present invention relates to a toner binder for dry toners to be used in electrophotography, electrostatic recording, electrostatic printing and so on.

BACKGROUND ART

When polyester-based toner binders for dry toners are used in toners, it is easy to provide the toners with both the ability to be fixed even at a low heated roll temperature (low temperature fixability) and the inability to fuse to the heated roll even at a high heated roll temperature (hot offset resistance) simultaneously, in particular good low temperature fixability, and therefore their consumption is showing a tendency toward increase.

Lately, electrophotography, electrostatic recording, electrostatic printing and the like techniques have come into wide use. They are now carried out under more diversified environmental conditions than before and, thus, when conventional toners are used in low temperature and low humidity environments for a long period of time, the quality of images on the photoconductor tends to deteriorate in certain instances. With the prior art toner binders (e.g. Japanese Kokai Publication 2002-148867), it is difficult to prevent the image quality from deteriorating while maintaining various toner characteristics.

SUMMARY OF THE INVENTION

The present inventors made intensive investigations in an attempt to develop a polyester-based toner binder capable of maintaining good low temperature fixability and hot offset resistance and preventing image quality deterioration even under low-temperature and low-humidity conditions and, as a result, found that such a toner binder can be obtained by using a polyester resin formed in the presence of a specific catalyst. Based on such and other findings, now the present invention has been completed.

Thus, the present invention consists in a toner binder for developing electrostatic charge images, which binder comprises a polycondensate polyester resin, said polyester resin being a product formed in the presence of at least one titanium-containing catalyst (A) selected from the group consisting of titanium halides (A1), titanium diketone enolates (A2), titanium carboxylates (A3), titanyl carboxylates (A4), and titanyl carboxylate salts (A5); and a toner binder for developing electrostatic charge images, which binder comprises a polycondensate polyester resin, said polyester resin being a product formed in the presence of at least one tin-containing catalyst (B) selected from the group consisting of dioctyltin oxide (B1), monobutyltin oxide (B2), and dibutyltin oxide (B3), with the content of tributyltin compounds in (B3) being not more than 250 ppm.

DETAILED DISCLOSURE OF THE INVENTION

In the following, the present invention is described in detail.

According to the invention, a polycondensate polyester resin formed in the presence of the above-mentioned titanium-containing catalyst (A) and/or the above-mentioned tin-containing catalyst (B) is used. It is also possible to use two or more species of (A) and/or two or more species of (B) combinedly.

Other polymerization catalysts than (A) or (B), for example zinc acetate, tetrabutoxytitanate, and dibutyltin oxide with a content of tributyltin compounds exceeding 250 ppm, cannot produce such effects that can be produced in accordance with the invention.

Among (A), the titanium halide (A1) is not particularly restricted but includes, among others, dichlorotitanium, trichlorotitanium, tetrachorotitanium, trifluorotitanium, tetrafluorotitanium, and tetrabromotitanium.

The titanium diketone enolate (A2) is not particularly restricted but includes, among others, titanium acetylacetonate, titanium diisopropoxide bisacetylacetonate, and titanyl acetylacetonate. Among those species of (A2), titanium acetylacetonate is preferred.

The titanium carboxylate (A3) is not particularly restricted but may be, for example, a titanium salt of an aliphatic carboxylic acid containing 1 to 32 carbon atoms (A3-1), or a titanium salt of an aromatic carboxylic acid containing 7 to 38 carbon atoms (A3-2). In the case of titanium salts of dibasic or further polybasic carboxylic acids, one or two or more carboxyl groups may coordinates with each titanium atom, and there may occur a free carboxyl group or groups not coordinating with titanium.

(A3-1) is not particularly restricted but may be, for example, an aliphatic monocarboxylic acid titanium salt (A3-1a), an aliphatic dicarboxylic acid titanium salt (A3-1b), an aliphatic tricarboxylic acid titanium salt (A3-1c), or an aliphatic tetra- to octa- or further basic polybasic carboxylic acid titanium salt (A3-1d).

(A3-1a) is not particularly restricted but includes, among others, titanium formate, titanium acetate, titanium propionate, and titanium octanoate. (A3-1b) is not particularly restricted but includes, among others, titanium oxalate, titanium succinate, titanium maleate, titanium adipate, and titanium sebacate. (A3-1c) is not particularly restricted but includes, among others, titanium hexanetricarboxylate and titanium isooctanetricarboxylate. (A3-1d) is not particularly restricted but includes, among others, titanium octanetetracarboxylate and titanium decanetetracarboxylate.

(A3-2) is not particularly restricted but may be, for example, an aromatic monocarboxylic acid titanium salt (A3-2a), an aromatic dicarboxylic acid titanium salt (A3-2b), an aromatic tricarboxylic acid titanium salt (A3-2c), or an aromatic tetra- to octa- or further basic polybasic carboxylic acid titanium salt (A3-2d).

(A3-2a) is not particularly restricted but includes, among others, titanium benzoate and the like. (A3-2b) is not particularly restricted but includes, among others, titanium phthalate, titanium terephthalate, titanium isophthalate, titanium 1,3-naphthalenedicarboxylate, titanium 4,4'-biphenyldicarboxylate, titanium 2,5-toluenedicarboxylate, and titanium anthracenedicarboxylate. (A3-2c) is not particularly restricted but includes, among others, titanium trimellitate and titanium 2,4,6-naphthalenetricarboxylate. (A3-2d) is not particularly restricted but includes, among others, titanium pyromellitate and titanium 2,3,4,6-naphthalenetetracarboxylate.

Among these titanium carboxylates (A3), (A3-2) are preferred, and (A3-2b) are more preferred.

The titanyl carboxylate (A4) is not particularly restricted but may be, for example, a titanyl salt of an aliphatic carboxylic acid containing 1 to 32 carbon atoms (A4-1) or a titanyl salt of an aromatic carboxylic acid containing 7 to 38 carbon atoms (A4-2). In the case of titanyl salts of dibasic or further polybasic carboxylic acids, one or two or more carboxyl groups may coordinate with each titanium atom, and there may occur a free carboxyl group or groups not coordinating with titanium.

(A4-1) is not particularly restricted but may be, for example, an aliphatic monocarboxylic acid titanyl salt (A4-1a), an aliphatic dicarboxylic acid titanyl salt (A4-1b), an aliphatic tricarboxylic acid titanyl salt (A4-1c), or an aliphatic tetra- to octa- or further basic polybasic carboxylic acid titanyl salt (A4-1d).

(A4-1a) is not particularly restricted but includes, among others, titanyl formate, titanyl acetate, titanyl propionate, and titanyl octanoate. (A4-1b) is not particularly restricted but includes, among others, titanyl oxalate, titanyl succinate, titanyl maleate, titanyl adipate, and titanyl sebacate. (A4-1c) is not particularly restricted but includes, among others, titanyl hexanetricarboxylate and titanyl isooctanetricarboxylate. (A4-1d) is not particularly restricted but includes, among others, titanyl octanetetracarboxylate and titanyl decanetetracarboxylate.

(A4-2) is not particularly restricted but may be, for example, an aromatic monocarboxylic acid titanyl salt (A4-2a), an aromatic dicarboxylic acid titanyl salt (A4-2b), an aromatic tricarboxylic acid titanyl salt (A4-2c), or an aromatic tetra- to octa- or further basic polybasic carboxylic acid titanyl salt (A4-2d).

(A4-2a) is not particularly restricted but includes, among others, titanyl benzoate and the like. (A4-2b) is not particularly restricted but includes, among others, titanyl phthalate, titanyl terephthalate, titanyl isophthalate, titanyl 1,3-naphthalenedicarboxylate, titanyl 4,4'-biphenyldicarboxylate, titanyl 2,5-toluenedicarboxylate, and titanyl anthracenedicarboxylate. (A4-2c) is not particularly restricted but includes, among others, titanyl trimellitate and titanyl 2,4,6-naphthalenetricarboxylate. (A4-2d) is not particularly restricted but includes, among others, titanyl pyromellitate and titanyl 2,3,4,6-naphthalenetetracarboxylate.

The titanyl carboxylate salt (A5) is not particularly restricted but includes, among others, alkali metal (e.g. lithium, sodium, potassium) salts and alkaline earth metal (e.g. magnesium, calcium, barium) salts of those titanyl carboxylates mentioned above as (A4-1b), (A4-1c), (A4-1d), (A4-2b), (A4-2c) or (A4-2d) [(A5-1b), (A5-1c), (A5-1d), (A5-2b), (A5-2c), and (A5-2d), respectively]. Among these, titanyl maleate salts and titanyl oxalate salts are preferred.

The amount of (A) that is to be used is not particularly restricted but the lower limit is preferably set at 0.01%, more preferably at 0.02%, still more preferably at 0.03%, most preferably at 0.05%, and the upper limit preferably at 5%, more preferably at 2%, still more preferably at 1.5%, most preferably at 0.8%, based on the total weight of the polyol and polycarboxylic acid used for obtaining the polyester resin. At addition levels not lower than 0.01%, the polycondensation catalyst activity is manifested to a satisfactory extent and, at levels not higher than 5%, the catalyst activity increases with the increase in catalyst amount. When a catalyst addition level is used within the above range to obtain a polyester resin for a toner binder, various characteristics required of the resulting toners comprising the toner binder become better and, in particular, the quality of images on the photoconductor under low-temperature and low-humidity conditions becomes better.

In the above and subsequent descriptions, "%" means "% by weight", unless otherwise specified.

Among the tin-containing catalysts (B), the dibutyltin oxide (B3) having a tributyltin compound (hereinafter referred to as "TBT" for short) content of not higher than 250 ppm can be obtained by synthesizing dibutyltin oxide in the conventional manner, for example, by carrying out the Grignard reaction using butyl chloride, as a starting material, with tin tetrachloride to give dibutyltin oxide, then dispersing the obtained dibutyltin oxide in an organic solvent and removing TBT as a solvent-soluble fraction by filtration (dispersion-washing method), or by removing TBT by extraction with an organic solvent using a Soxhlet extractor, for instance (recycling-washing method). Commercially available dibutyltin oxide products generally contain 400 to 600 ppm of TBT, hence are not suited for use in the practice of the invention.

In the foregoing and subsequent descriptions, "ppm" means "ppm on the weight basis".

The TBT referred to above is not particularly restricted but includes, as typical homologues, bis(tributyltin) oxide (tributyltin oxide), tributyltin chloride, and tributyltin acetate.

The organic solvent to be used for dispersion-washing is not particularly restricted but includes, among others, alcohols (methanol, ethanol, isopropyl alcohol, etc.), ketones (acetone, diethyl ketone, methyl ethyl ketone, etc.), ethers (diethyl ether, tetrahydrofuran, etc.), other polar solvents (dimethyl sulfoxide, dimethylformamide, etc.), aliphatic hydrocarbons (hexane, pentane, etc.), aromatic hydrocarbons (toluene, xylene, etc.), and combinations of such organic solvents.

Among those, the combination of an alcohol and an aliphatic hydrocarbon and the combination of an alcohol and an aromatic hydrocarbon are preferred, and the combination of methanol and hexane and the combination of methanol and toluene are more preferred.

The amount of the organic solvent that is to be used in the step of dispersion-washing is not particularly restricted but generally is such that the organic solvent amounts to 0.1 to 500 parts, preferably 1 to 200 parts, more preferably 5 to 100 parts, per part of dibutyltin oxide. In the above and subsequent descriptions, "part(s)" means "part(s) by weight".

The method of dispersing is not particularly restricted but, for example, the method comprising stirring using a stirring blade, shaking in a vessel, or using a ball mill for wet dispersion may be employed. After dispersion, the solvent can be removed by filtration, centrifugation, or some other appropriate method.

The organic solvent to be used in recycling-washing is not particularly restricted but includes, among others, those alcohols, ketones, ethers, aliphatic hydrocarbons, and aromatic hydrocarbons mentioned above, and combinations of these organic solvents.

The TBT content of (B3) is generally 250 ppm or lower. Preferably, the upper limit is 150 ppm, more preferably 75 ppm, still more preferably 25 ppm, most preferably 1 ppm. The lower limit is preferably not more than 0.5 ppm. When the TBT content exceeds 250 ppm, the quality of images on the photoconductor deteriorates under low-temperature and low-humidity conditions.

The amount of (B) that is to be used is not particularly restricted but the lower limit is preferably set at 0.01%, more preferably at 0.02%, still more preferably at 0.03%, most preferably at 0.05%, and the upper limit preferably at 5%, more preferably at 2%, still more preferably at 1.5%, most preferably at 0.8%, based on the total weight of the polyol and polycarboxylic acid used for obtaining the polyester resin. At addition levels not lower than 0.01%, the polycondensation catalyst activity is manifested to a satisfactory extent and, at levels not higher than 5%, the catalyst activity increases with the increase in catalyst amount. When a toner binder comprising the polyester resin obtained by employing a catalyst amount level within the above range is used, various characteristics required of the resulting toners comprising the toner binder become better and, in particular, the quality of images on the photocondenser under low-temperature and low-humidity conditions becomes better. In cases where (A) and (B) are used in combination, the catalyst amount is preferably within the above range, too.

When (B2) and/or (B3) is used as (B), the amount thereof to be used is not particularly restricted but preferably is such that the TBT content in the polyester resin obtained amounts to not more than 0.6 ppm, more preferably not more than 0.3 ppm, still more preferably not more than 0.1 ppm, most preferably not more than 0.05 ppm, in order that the quality of images on the photoconductor under low-temperature and low-humidity conditions may be more improved.

Preferred among these catalysts (A) and (B) are titanium diketone enolates (A2), titanium carboxylates (A3), titanyl carboxylate salts (A5), and combinations of these. More preferred are (A2), aromatic carboxylic acid titanium salts (A3-2), titanyl aliphatic carboxylate salts (A5-1), titanyl aromatic carboxylate salts (A5-2), and combinations of these. Still more preferred are titanium acetylacetonate, (A3-2b), alkali metal salts among (A5-1b), alkali metal salts among (A5-2b), and combinations of these. Still more preferred are titanium terephthalate, titanium isophthalate, titanium orthophthalate, titanyl oxalate salts, titanyl maleate salts, and combinations of these. Most preferred are titanium terephthalate, titanyl oxalate potassium salt, and the combination of these.

The polycondensate polyester resin to constitute the toner binder of the present invention is not particularly restricted but includes, among others, polyester resins (X), which are polyol-polycarboxylic acid polycondensates, modified polyester resins (Y) obtained by further reacting (X) with a polyepoxide (C), and the like. The resins (X), (Y) and so on may be used singly or as a mixture of two or more species.

The polyol is not particularly restricted but includes, among others, diols (G) and tri- or further hydric polyhydric polyols (H). The polycarboxylic acid is not particularly restricted but includes, among others, dicarboxylic acids (I) and tri- or further basic polybasic polycarboxylic acids (J).

The polyester resin constituting the toner binder of the invention is not particularly restricted but specifically includes, for example, those listed below. These may also be used in combination.

(X1): Linear polyester resins produced by using (G) and (I).
(X2): Nonlinear polyester resins produced by using (H) and/or (J) together with (G) and (I).
(Y1): Modified polyester resins produced by reacting (X2) with (C).

The diol (G) is not particularly restricted but includes, among others, diols having an hydroxyl value of 180 to 1,900 mg KOH/g, more specifically alkylene glycols containing 2 to 12 carbon atoms (ethylene glycol, 1,2-propylene glycol, 1,3-propylene glycol, 1,4-butylene glycol, 1,6-hexanediol, etc.); alkylene ether glycols (diethylene glycol, triethylene glycol, dipropylene glycol, polyethylene glycol, polypropylene glycol, polybutylene glycol, etc.); alicyclic diols (1,4-cyclohexanedimethanol, hydrogenated bisphenol A, etc.); bisphenols (bisphenol A, bisphenol F, bisphenol S, etc.); adducts of the above-mentioned alicyclic diols with an alkylene oxide(s) containing 2 to 4 carbon atoms [ethylene oxide (hereinafter referred to as "EO" for short), propylene oxide (hereinafter referred to as "PO" for short), butylene oxide (hereinafter referred to as "BO" for short), etc.]; and adducts of the above-mentioned bisphenols with an alkylene oxide(s) (EO, PO, BO, etc.).

Preferred among these are alkylene glycols containing 2 to 12 carbon atoms, alkylene oxide adducts of bisphenols, and combinations thereof. More preferred are alkylene oxide adducts of bisphenols, and the combinations thereof with an alkylene glycol(s) containing 2 to 12 carbon atoms.

The hydroxyl value and acid value referred to in the above and subsequent descriptions are determined by the methods defined in JIS K 0070.

The tri- or further hydric polyhydric polyol (H) is not particularly restricted but includes, among others, polyols having a hydroxyl value of 150 to 1,900 mg KOH/g, more specifically tri- to octa-hydric or further-hydric polyhydric aliphatic alcohols (glycerol, triethylolethane, trimethylolpropane, pentaerythritol, sorbitol, etc.); adducts of the above-mentioned aliphatic polyols with an alkylene oxide(s) containing 2 to 4 carbon atoms (EO, PO, BO, etc.); trisphenols (trisphenol PA etc.); novolak resins (phenol novolak, cresol novolak, etc.); adducts of the above-mentioned trisphenols with an alkylene oxide containing 2 to 4 carbon atoms (EO, PO, BO, etc.); and adducts of the above-mentioned novolak resins with an alkylene oxide(s) containing 2 to 4 carbon atoms (EO, PO, BO, etc.).

Preferred among them are tri- to octa-hydric and further-hydric polyhydric aliphatic alcohols and alkylene oxide adducts of novolak resin. Most preferred are alkylene oxide adducts of novolak resin.

The dicarboxylic acid (I) is not particularly restricted but includes, among others, dicarboxylic acids having an acid value of 180 to 1,250 mg KOH/g, more specifically alkylenedicarboxylic acids containing 4 to 36 carbon atoms (succinic acid, adipic acid, sebacic acid, dodecenylsuccinic acid, etc.); alkenylenedicarboxylic acids containing 4 to 36 carbon atoms (maleic acid, fumaric acid, etc.); aromatic dicarboxylic acids containing 8 to 36 carbon atoms (phthalic acid, isophthalic acid, terephthalic acid, naphthalenedicarboxylic acid, etc.); and the like. Preferred among them are alkenylenedicarboxylic acids containing 4 to 20 carbon atoms and aromatic dicarboxylic acids containing 8 to carbon atoms. The combined use of two or more of these will not produce any problem. Also usable as (I) are acid anhydrides and lower ($C_{1-4}$) alkyl esters (methyl ester, ethyl ester, isopropyl ester, etc.) of those mentioned above.

The tri- or further basic polybasic polycarboxylic acid (J) is not particularly restricted but includes, among others, polycarboxylic acids having an acid value of 150 to 1,250 mg KOH/g, more specifically aromatic polycarboxylic acids containing 9 to 20 carbon atoms (trimellitic acid, pyromellitic acid, etc.); vinyl polymers of unsaturated carboxylic acids (styrene-maleic acid copolymer, styrene-acrylic acid copolymer, α-olefin-maleic acid copolymers, styrene-fumaric acid copolymer, etc.); and the like. Preferred among these are aromatic polycarboxylic acids containing 9 to 20 carbon atoms. Most preferred are trimellitic acid and pyromellitic acid. Also usable as the tri- or further-basic polybasic polycarboxylic acids (J) are acid anhydrides and lower ($C_{1-4}$) alkylesters (methyl ester, ethylester, isopropylester, etc.) of those mentioned above.

It is also possible to copolymerize a hydroxycarboxylic acid (K) together with (G), (H), (I) and (J).

The hydroxycarboxylic acid (K) is not particularly restricted but includes, among others, hydroxystearic acid and hydrogenated castor oil fatty acids.

The polyepoxide (C) is not particularly restricted but includes, among others, polyglycidyl ethers [ethylene glycol diglycidyl ether, tetramethylene glycol diglycidyl ether, bisphenol A diglycidyl ether, bisphenol F diglycidyl ether, glycerol triglycidyl ether, pentaerythritol tetraglycidyl ether, glycidyl etherified phenol novolak (average degree of polymerization 3 to 60), etc.]; and diene oxides (pentadiene dioxide, hexadiene dioxide, etc.). Preferred among them are polyglycidyl ethers. More preferred are ethylene glycol diglycidyl ether and bisphenol A diglycidyl ether.

The number of epoxy groups per molecule of (C) is preferably 2 to 8, more preferably 2 to 6, most preferably 2 to 4.

The epoxy equivalent of (C) is not particularly restricted but preferably is 50 to 500. The lower limit is more preferably 70, most preferably 80, and the upper limit is more preferably 300, most preferably 200. When the number of epoxy groups or/and the epoxy equivalent are within the respective ranges mentioned above, both the developability and fixability become better. It is more desirable that both the number of epoxy groups per molecule and the epoxy equivalent be within the respective ranges mentioned above.

The polyol-to-polycarboxylic acid ratio, as expressed in terms of hydroxyl group [OH]-to-carboxyl group [COOH] equivalent ratio [OH]/[COOH], is preferably 2/1 to 1/2, more preferably 1.5/1 to 1/1.3, most preferably 1.3/1 to 1/1.2. The polyol and polycarboxylic acid species to be used are preferably selected in view of molecular weight adjustment so that the polyester-based toner binder finally prepared may have a glass transition point of 40 to 90° C.

Specific examples of (X1) include, but are not limited to, the following (1) to (3), among others.
(1) Polycondensate of bisphenol A-PO (2 moles) adduct/terephthalic acid.
(2) Polycondensate of bisphenol A-EO (4 moles) adduct/bisphenol A-PO (2 moles) adduct/terephthalic acid.
(3) Polycondensate of bisphenol A-PO (2 moles) adduct/bisphenol A-PO (3 moles) adduct/terephthalic acid/isophthalic acid/maleic anhydride.

Specific examples of (X2) include, but are not limited to, the following (4) to (10), among others.
(4) Polycondensate of bisphenol A-EO (2 moles) adduct/bisphenol A-PO (3 moles) adduct/terephthalic acid/phthalic anhydride/trimellitic anhydride.
(5) Polycondensate of bisphenol A-PO (2 moles) adduct/bisphenol A-PO (3 moles) adduct/bisphenol A-EO (2 moles) adduct/phenol novolak-PO (5 moles) adduct/terephthalic acid/maleic anhydride/dimethyl terephthalate/trimellitic anhydride.
(6) Polycondensate of Bisphenol A-EO (2 moles) adduct/bisphenol A-PO (2 moles) adduct/terephthalic acid/trimellitic anhydride.
(7) Polycondensate of bisphenol A-EO (2 moles) adduct/bisphenol A-PO (2 moles) adduct/terephthalic acid/maleic anhydride/trimellitic anhydride.
(8) Polycondensate of bisphenol A-PO (2 moles) adduct/bisphenol A-PO (3 moles) adduct/terephthalic acid/isophthalic acid/maleic anhydride/trimellitic anhydride.
(9) polycondensate of bisphenol A-PO (2 moles) adduct/bisphenol A-PO (3 moles) adduct/phenol novolak-EO adduct/isophthalic acid/trimellitic anhydride.
(10) Polycondensate of bisphenol A-EO (2 moles) adduct/bisphenol A-PO (2 moles) adduct/phenol novolak-PO (5 moles) adduct/terephthalic acid/fumaric acid/trimellitic anhydride.

Specific examples of (Y1) include, but are not limited to, the following (11) to (20), among others.
(11) Modified polyester derived from polycondensate of bisphenol A-PO (2 moles) adduct/bisphenol A-EO (2 moles) adduct/phenol novolak-PO (5 moles) adduct/terephthalic acid/dodecenylsuccinic anhydride by reaction with tetramethylene glycol diglycidyl ether.
(12) Modified polyester derived from polycondensate of bisphenol A-PO (2 moles) adduct/bisphenol A-PO (3 moles) adduct/bisphenol A-EO (2 moles) adduct/phenol novolak-PO (5 moles) adduct/terephthalic acid/dodecenylsuccinic anhydride by reaction with ethylene glycol diglycidyl ether.
(13) Modified polyester derived from polycondensate of bisphenol A-PO (2 moles) adduct/bisphenol A-PO (3 moles) adduct/phenol novolak-EO adduct/isophthalic acid/maleic anhydride/trimellitic anhydride by reaction with bisphenol A diglycidyl ether.
(14) Modified polyester derived from polycondensate of bisphenol A-PO (2 moles) adduct/bisphenol A-PO (3 moles) adduct/bisphenol A-EO (2 moles) adduct/phenol novolak-EO adduct/terephthalic acid/isophthalic acid/trimellitic anhydride by reaction with bisphenol A diglycidyl ether.
(15) Modified polyester derived from polycondensate of bisphenol A-PO (2 moles) adduct/bisphenol A-PO (3 moles) adduct/bisphenol A-EO (2 moles) adduct/phenol novolak-PO (5 moles) adduct/terephthalic acid/isophthalic acid/maleic anhydride/trimellitic anhydride by reaction with bisphenol A diglycidyl ether.
(16) Modified polyester derived from polycondensate of bisphenol A-PO (3 moles) adduct/phenol novolak-PO (5 moles) adduct/terephthalic acid/fumaric acid/trimellitic anhydride by reaction with ethylene glycol diglycidyl ether.
(17) Modified polyester derived from polycondensate of bisphenol A-PO (2 moles) adduct/phenol novolak-PO (5 moles) adduct/terephthalic acid/dodecenylsuccinic anhydride/trimellitic anhydride by reaction with tetramethylene glycol diglycidyl ether.
(18) Modified polyester derived from polycondensate of bisphenol A-PO (2 moles) adduct/bisphenol A-EO (2 moles) adduct/phenol novolak-EO adduct/terephthalic acid/trimellitic anhydride by reaction with ethylene glycol diglycidyl ether.
(19) Modified polyester derived from polycondensate of bisphenol A-PO (2 moles) adduct/bisphenol A-PO (3 moles) adduct/phenol novolak-PO (5 moles) adduct/terephthalic acid/trimellitic anhydride by reaction with bisphenol A diglycidyl ether.
(20) Modified polyester derived from polycondensate of bisphenol A-PO (2 moles) adduct/bisphenol A-EO (2 moles) adduct/terephthalic acid/trimellitic anhydride by reaction with glycidyl etherified phenol novolak.

Toner binders are required to have different physical properties according to their intended use, for full-color use or monochrome use. Accordingly, the polyester resins are designed in different ways.

Thus, highly glossy images are required for full-color use, hence it is necessary to reduce the binder viscosity whereas, for monochrome use, gloss is not particularly required but hot offset resistance is regarded as important, hence highly elastic binders are needed.

For obtaining highly glossy images of value in full-color copiers or the like, (X1), (X2), (Y1), and mixtures of these are preferred. In this case, low viscosity is preferred and, therefore, the proportion of (H) and/or (J) constituting the polyester resins is preferably such that the sum of moles of (H) and (J) amounts to 0 to 20 mole percent, more preferably 0 to 15 mole percent, most preferably 0 to 10 mole percent, relative to the sum of moles of (G) to (J).

For attaining high hot offset resistance of use in monochrome copiers and so forth, (X2), (Y1), and mixtures of these are preferred. In this case, high elasticity is preferred and, therefore, polyester resins produced by using both (H) and (J) are particularly preferred. The proportion of (H) plus (J) is preferably such that the sum of the numbers of moles of (H) and (J) is 0.1 to 40 mole percent, more preferably 0.5 to 25 mole percent, most preferably 1 to 20 mole percent, relative to the sum of the numbers of moles of (G) to (J).

In the case of polyester resins for full-color use, the temperature (TE) at which the complex viscosity amounts to 100 Pa·s is preferably 90 to 170° C., more preferably 100 to 165° C., most preferably 105 to 150° C. At 170° C. or below, satisfactory gloss is obtained and, at 90° C. or above, good heat resistance/storage stability are attained.

TE can be determined, for example, by subjecting a block prepared after 30 minutes of melting and kneading of the resin at 130° C. and 70 rpm using a laboratory plastomill to complex viscosity ($\eta^*$) measurements using a commercial dynamic viscoelasticity measuring apparatus while varying the resin temperature.

From the gloss viewpoint, the THF-insoluble matter content of the polyester resin for full-color use is preferably not more than 10%, still more preferably not more than 5%.

The THF-insoluble fraction and THF-soluble fraction can be determined by the following method.

About 0.5 g of the sample is accurately weighed in a 200-ml ground stoppered Erlenmeyer flask, 50 ml of THF is added and, after 3 hours of refluxing with stirring and the subsequent cooling, the insoluble matter is filtered off using a glass filter. The THF-insoluble matter content (%) is calculated from the weight ratio between the weight of the resin fraction on the glass filter after 3 hours of drying under vacuum at 80° C. and the sample weight.

This filtrate is used as the THF-soluble fraction in the molecular weight measurement to be described later herein.

In the case of polyester resins for monochrome use, the temperature (TG) at which the storage elastic modulus (G') of the polyester resin amounts to 6,000 Pa is preferably 130 to 230° C., more preferably 140 to 230° C., most preferably 150 to 230° C., from the hot offset resistance viewpoint.

TG can be determined, for example, by subjecting a block prepared after 30 minutes of melting and kneading of the resin at 130° C. and 70 rpm using a laboratory plastomill to storage modulus (G') measurements using a commercial dynamic viscoelasticity measuring apparatus while varying the resin temperature.

From the low temperature fixability and heat resistance/storage stability viewpoint, the temperature (TE) at which the complex viscosity ($\eta^*$) of a polyester resin for monochrome use amounts to 1,000 Pa·s is preferably 80 to 140° C., more preferably 90 to 135° C., most preferably 105 to 130° C.

The polyester resin for monochrome use preferably has a tetrahydrofuran (THF)-insoluble matter content of 5 to 70%, more preferably 10 to 60%, most preferably 15 to 50%. At THF-insoluble matter content levels not lower than 5%, good hot offset resistance is obtained and, at levels not exceeding 70%, good low temperature fixability is attained.

For both monochrome and full-color uses, the polyester resin preferably has a peak top molecular weight of 1,000 to 30,000, more preferably 1,500 to 25,000, most preferably 1,800 to 20,000. When the peak top molecular weight is 1,000 or more, the heat resistance/storage stability and powder flowability become improved and, when it is not more than 30,000, the grindability of the toner becomes improved and the productivity becomes better.

In the above and the subsequent description, the peak top molecular weight and number average molecular weight of a polyester resin are determined for the THF-soluble fraction by GPC under the following conditions.

Apparatus: Tosoh HLC-8120
Columns: TSK gel GMHXL (two columns)
TSK gel Multipore HXL-M (one column)
Measurement temperature: 40° C.
Sample solution: 0.25% solution in THF
Solution injection size: 100 µl
Detector: Refractive index detector
Reference material: Polystyrene The molecular weight corresponding to the maximum peak height on the chromatogram obtained is referred to as "peak top molecular weight".

For both monochrome and full-color uses, the Tg of the polyester resin is preferably within the range of 40 to 90° C., more preferably 50 to 80° C., most preferably 55 to 75° C. When the Tg is within the range of 40° C. to 90° C., the heat resistance/storage stability and low temperature fixability become better.

The Tg of a polyester resin, so referred to hereinabove and hereinafter, is determined by the method (DSC method) prescribed in ASTM D3418-82 using Seiko Denshi Kogyo's DSC 20, SSC/580.

The method of producing the linear polyester resin (X1) is not particularly restricted but may be, for example, the method comprising heating the diol (G), dicarboxylic acid (I) and polycondensation catalyst at 180° C. to 260° C. for effecting dehydrocondensation under atmospheric pressure and/or reduced pressure conditions to give the polyester resin (X1).

The method of producing the nonlinear polyester resin (X2) is not particularly restricted but may be, for example, the one comprising heating the diol (G), dicarboxylic acid (I), at least trihydric polyol (H) and polycondensation catalyst at 180° C. to 260° C. for effecting dehydrocondensation under atmospheric pressure and/or reduced pressure conditions and further subjecting the tri- or further basic polybasic polycarboxylic acid (J) to reaction to give the polyester resin (X2). It is also possible to subject the tri- or further basic polybasic polycarboxylic acid (J) to reaction simultaneously with the diol (G), dicarboxylic acid (I) and tri- or further basic polyhydric polyol (H).

The method of producing the modified polyester resin (Y1) is not particularly restricted but may be, for example, the one comprising adding the polyepoxide (C) to the nonlinear polyester resin (X2) and carrying out a molecule extension reaction of the polyester at 180° C. to 260° C. to give the modified polyester resin (Y1).

The toner binder according to the invention may also comprise two or more polyester resin species.

The toner binder according to the invention may contain, where necessary, at least one mold release agent (D) selected from the group consisting of carnauba wax (D1), Fischer-Tropsch wax (D2), paraffin wax (D3) and polyolefin wax (D4).

(D1) is not particularly restricted but includes, among others, natural carnauba wax, fatty acid-free carnauba wax, etc.

(D2) is not particularly restricted but includes, among others, petroleum-derived Fischer-Tropsch waxes (e.g. Schumann Sasol's Paraflint H1, Paraflint H1N4, Paraflint C105), natural gas-derived Fischer-Tropsch waxes (e.g. Shell MDS's FT 100 etc.), and purification products derived from these Fischer-Tropsch waxes by, for example, fractional crystallization (e.g. Nippon Seiro's MDP-7000, MDP-7010).

(D3) is not particularly restricted but includes, among others, petroleum wax-based paraffin waxes (Nippon Seiro's paraffin waxes HNP-5, HNP-9, HNP-11).

(D4) is not particularly restricted but includes, among others, polyethylene waxes (e.g. Sanyo Chemical Industries' Sanwax 171P, Sanwax LEL 400 P), and polypropylene waxes (Sanyo Chemical Industries' Viscol 550P, Viscol 660P).

Among them, carnauba waxes and Fischer-Tropsch waxes are preferred. More preferred are carnauba waxes and Petroleum-derived Fischer-Tropsch waxes. The use of such a wax as a mold release agent results in more improved low temperature fixability when the binder is used in preparing toners.

When the toner binder of the invention contains such mold release agent (D), the content of (D) is preferably 0.01 to 20%, more preferably 0.1 to 15%, most preferably 0.5 to 10%, based on the total weight of the polyester resin plus (D). When an addition level of the mold release agent is within the range of 0.01 to 20%, the resulting toners acquire more improved hot offset resistance.

The toner binder of the present invention may contain, where necessary, a charge control agent (E).

(E) is not particularly restricted but includes, among others, nigrosine dyes, quaternary ammonium salt compounds, quaternary ammonium salt group-containing polymers, metal-containing azo dyes, salicylic acid metal salts, sulfonic acid group-containing polymers, fluorine-containing polymers, and halo-substituted aromatic ring-containing polymers.

When the toner binder of the invention contains such charge control agent (E), the content of (E) is not particularly restricted but preferably is 0.01 to 5%, more preferably 0.02 to 4%, based on the total weight of the polyester resin plus (E).

The polyester resin of the invention may contain another resin or the like, where necessary.

The other resin is not particularly restricted but includes, among others, styrenic resins [e.g. styrene-alkyl (meth) acrylate copolymers, styrene-diene monomer copolymers], epoxy resins (e.g. bisphenol A-epichlorohydrin addition condensates), and urethane resins (e.g. diol-diisocyanate polyaddition products).

Generally, the other resin has a weight average molecular weight of 1,000 to 2,000,000.

The content of the other resin in the toner binder is not particularly restricted but preferably is 0 to 40%, more preferably 0 to 30%, most preferably 0 to 20%, based on the total weight of the polyester resin plus mold release agent.

When two or more polyester resins according to the invention are used in combination, or when one polyester resin is admixed with a mold release agent and/or another resin, powder mixing or melt mixing may be carried out in advance or mixing may be carried out in toner preparation.

The temperature in carrying out melt mixing is not particularly restricted but generally is 80 to 180° C., preferably 100 to 170° C., more preferably 120 to 160° C.

It is unfavorable to mix at excessively low temperatures since satisfactory mixing cannot be accomplished but the system may be inhomogeneous. When the mixing temperature in mixing two or more polyester resins together is excessively high, averaging due to transesterification and other reactions may occur, and it becomes impossible to maintain those resin properties which are required of toner binders.

The mixing time for melt mixing is not particularly restricted but preferably is 10 seconds to 30 minutes, more preferably 20 seconds to 10 minutes, most preferably 30 seconds to 5 minutes. When the mixing time in mixing two or more polyester resins together is excessively long, averaging due to transesterification and other reactions may occur, making it impossible to maintain those resin properties which are required of toner binders.

The mixing apparatus for melt mixing is not particularly restricted but includes, among others, batch type mixing apparatus, such as reaction vessels, and continuous mixing apparatus. For attaining uniform mixing at an adequate temperature for a short period of time, a continuous mixing apparatus is preferred. The continuous mixing apparatus is not particularly restricted but includes, among others, extruders, continuous kneaders, and three-roll mills. Among them, extruders and continuous kneaders are preferred.

In the case of powder mixing, mixing can be attained using conventional mixing conditions and a conventional mixing apparatus.

The mixing conditions in powder mixing are not particularly restricted but the mixing temperature is preferably 0 to 80° C., more preferably 10 to 60° C. The mixing time is not particularly restricted but preferably is not shorter than 3 minutes, more preferably 5 to 60 minutes. The mixing apparatus is not particularly restricted but includes, among others, Henschel mixers, Nauta mixers, and Banbury mixers. Henschel mixers are preferred, however.

An example of the production of an electrophotographic toner using the toner binder of the present invention is now described. The toner is constituted of the toner binder of the invention and a colorant, if necessary together with one or more of various additives such as mold release agents, charge control agents, and flowability providing agents.

The content of the toner binder in the toner is not particularly restricted but, when a dye or pigment is used as the colorant, it is preferably 70 to 98%, more preferably 74 to 96%. When a magnetic powder is used, it is preferably 20 to 85%, more preferably 35 to 65%.

The colorant is not particularly restricted but includes, among others, dyes, pigments, and magnetic powders. Specifically, there may be mentioned carbon black, Sudan Black SM, Fast Yellow G, Benzidine Yellow, Pigment Yellow, Indofast Orange, IRGAZIN Red, para-nitroaniline red, Toluidine Red, carmine FB, Pigment Orange R, Lake Red 2G, Rhodamine FB, Rhodamine B Lake, Methyl Violet B Lake, phthalocyanine blue, Pigment Blue, Brilliant Green, phthalocyanine green, Oil Yellow GG, Kayaset YG, Orasol Brown B, Oil Pink OP, magnetite, and iron black.

The content of the colorant in the toner is not particularly restricted but, when a dye or pigment is used, for instance, it is preferably 2 to 15%. When a magnetic powder is used, it is preferably 15 to 70%, more preferably 30 to 60%.

The mold release agent (D) is not particularly restricted but mention may be made of those mentioned hereinabove. In using (D), it may be the same as or different from the mold release agent mentioned above.

The amount of the mold release agent in the toner is not particularly restricted but is preferably 0 to 10%, more preferably 1 to 7%.

The charge control agent (E) is not particularly restricted but includes, among others, those mentioned hereinabove.

The content of (E) in the toner is not particularly restricted but preferably is 0 to 5%, more preferably 0.01 to 4%.

The flowability providing agent is not particularly restricted but includes, among others, colloidal silica, alumina powders, titanium oxide powders, and calcium carbonate powders.

The content of the flowability-providing agent in the toner is preferably 0 to 5%.

The method of producing toners is not particularly restricted but may comprise, for example, kneading and grinding method. After dry blending of the toner constituents mentioned above, the mixture is melt-kneaded and then finely ground using a jet mill or the like, followed by air classification, whereby particles generally having a particle diameter D50 of 2 to 20 μm are obtained.

The particle diameter D50 can be determined using a Coulter counter [e.g. trademark: Multisizer III (product of Coulter)].

The toner prepared by using the toner binder of the invention, if necessary after admixing with carrier particles such as a magnetic powder (e.g. iron powder, nickel powder, ferrite, magnetite), glass beads, and/or ferrite whose surface is coated with a resin (e.g. acrylic resin, silicone resin), is used as an electric latent image developer. It is also possible to form electric latent images by friction with such a member as a charged blade in lieu of the use of carrier particles.

The toner is then fixed to a support (e.g. paper, polyester film) by the conventional heated roll fixation method, for instance, to give a recorded product.

BEST MODES FOR CARRYING OUT THE INVENTION

The following examples further illustrate the present invention. They are, however, by no means limitative of the scope of the present invention. In the following, "part(s)" means "part(s) by weight".

The methods of determining the softening point and TBT content as used in the examples and comparative examples are as follows.

1. Softening Point Determination Method

A flow tester is used, and the temperature is raised at a constant rate under the following conditions. The temperature at which the discharge amount becomes ½ is the softening point.

Apparatus: Shimadzu Flow Tester CFT-500D
Load: 20 kgf/cm$^2$
Die: 1 mm Φ–1 mm
Rate of temperature rise: 6° C./min
Sample amount: 1.0 g 2. TBT Content Determination Method
(1) Apparatus: GC-MS (JEOL's JMS GC mate II)
(2) GC conditions
Column: CP-SIL-5CB (film thickness 0.25 micrometer, inside diameter 0.25 mm, length 60 m)
Measurement temperature: 100° C. to 210° C. (5° C./min), 210° C. to 300° C. (10° C./min)
(3) MS conditions
Detection: SIM (selective ion monitoring)
Acceleration voltage: 2.5 kV
Ion source temperature: 230° C.
Measured mass number: 277
(4) Procedure The sample (2.5 g) is dissolved in chloroform. The solution is added to a hydrochloric acid-acetonitrile solution, and the mixture is heated for chlorination. The supernatant is concentrated, and the concentrate is extracted with hexane. After dehydration, the extract is concentrated. Propylation is effected using a propylmagnesium bromide solution, followed by treatment with diluted sulfuric acid and extraction with hexane. The extract is concentrated to 1 mL. This concentrate is used as the sample.

PRODUCTION EXAMPLE 1

[Dibutyltin Oxide Purification—1]

Dibutyltin oxide (L) (5.0 parts) with a TBT content of 453 ppm was weighed in an Erlenmeyer flask, 50 parts of methanol and 50 parts of hexane were added, the contents were stirred by means of a magnetic stirrer at room temperature for 1 hour, and the solvent was then filtered off. This procedure was repeated ten times to give 3.5 parts of dibutyltin oxide (M) having a TBT content of 5.12 ppm.

Dibutyltin oxide (N) (3.2 parts) having a TBT content of 0.92 ppm was obtained in the same manner except that the purification procedure was repeated 20 times.

[Dibutyltin Oxide Purification—2]

Dibutyltin oxide (P) (5.0 parts) with a TBT content of 505 ppm was subjected to Soxhlet extraction with tetrahydrofuran for 10 hours to give 2.5 parts of dibutyltin oxide (Q) with a TBT content of 71.2 ppm.

<Evaluation in the Form of a Color Toner>

EXAMPLE 1

[Linear Polyester Resin Synthesis]

A reaction vessel equipped with a condenser, stirrer and nitrogen inlet tube was charged with 430 parts of bisphenol A-PO (2 moles) adduct, 300 parts of bisphenol A-PO (3 moles) adduct, 257 parts of terephthalic acid, 65 parts of isophthalic acid, 10 parts of maleic anhydride, and 2 parts of potassium titanyl oxalate as a polycondensation catalyst, and the reaction was carried out under a nitrogen stream at 220° C. for 10 hours while distilling off the byproduct water. Then, the reaction was further allowed to proceed under reduced pressure (5 to 20 mm Hg). When the acid value reached 5, the product was taken out, cooled to room temperature, and ground to give a linear polyester resin (X1-1).

(X1-1) contained no THF-insoluble fraction and had an acid value of 8, a hydroxyl value of 12, a Tg of 59° C., a number average molecular weight of 6,890, and a peak top molecular weight of 19,800.

[Nonlinear Polyester Resin Synthesis]

A reaction vessel equipped with a condenser, stirrer and nitrogen inlet tube was charged with 350 parts of bisphenol A-EO (2 moles) adduct, 326 parts of bisphenol A-PO (3 moles) adduct, 278 parts of terephthalic acid, 40 parts of phthalic anhydride, and 1.5 parts of potassium titanyl oxalate as a polycondensation catalyst, and the reaction was carried out under a nitrogen stream at 230° C. for 10 hours while distilling off the byproduct water. Then, the reaction was further allowed to proceed under reduced pressure (5 to 20 mm Hg). When the acid value reached 2, the flask contents were cooled to 180° C., 62 parts of trimellitic anhydride was added, and the reaction was allowed to proceed at ordinary pressure for 2 hours in a tightly closed condition, the product was then taken out, cooled to room temperature, and ground to give a nonlinear polyester resin (X2-1).

(X2-1) contained no THF-insoluble fraction and had an acid value of 36, a hydroxyl value of 17, a Tg of 69° C., a number average molecular weight of 3,810, and a peak top molecular weight of 11,400.

[Toner Binder Synthesis]

400 parts of (X1-1) and 600 parts of (X2-1) were melted and mixed together in a continuous kneader at a jacket temperature of 150° C. The residence time was 3 minutes. The melted resin was cooled to 30° C. in 4 minutes using a steel belt cooler, followed by grinding to give a toner binder (TB1) of the invention.

EXAMPLE 2

[Linear Polyester Resin Synthesis]

A linear polyester resin (X1-2) was produced by carrying out the reaction in the same manner as in the case of (X1-1) in Example 1 except that 2 parts of titanium terephthalate was used as the polycondensation catalyst, followed by cooling to room temperature and grinding.

(X1-2) contained no THF-insoluble fraction and had an acid value of 7, a hydroxyl value of 11, a Tg of 59° C., a number average molecular weight of 7,010, and a peak top molecular weight of 20,100.

[Nonlinear Polyester Resin Synthesis]

A nonlinear polyester resin (X2-2) was produced by carrying out the reaction in the same manner as in the case of (X2-1) in Example 1 except that 1.5 parts of titanium terephthalate was used as the polycondensation catalyst, followed by cooling to room temperature and grinding.

(X2-2) contained no THF-insoluble fraction and had an acid value of 33, a hydroxyl value of 15, a Tg of 69° C., a number average molecular weight of 4,130, and a peak top molecular weight of 11,830.

[Toner Binder Synthesis]

The polyester (X1-2) (500 parts) and the polyester (X2-2) (500 parts) were subjected to powder mixing in a Henschel mixer for 5 minutes to give a toner binder resin (TB2) of the invention.

EXAMPLE 3

[Linear Polyester Resin Synthesis]

A linear polyester resin (X1-3) was produced by carrying out the reaction in the same manner as in the case of (X1-1) in Example 1 except that 2 parts of dibutyltin oxide (M) was used as the polycondensation catalyst. After 10-hour reaction at 220° C., the acid value was 15. (X1-3) had a TBT content of less than 0.01 ppm (below the detection limit of GC-MS-SIM), a THF-insoluble matter content of 0%, an acid value of 7, a hydroxyl value of 12, a Tg of 59° C., a number average molecular weight of 6,700, and a peak top molecular weight of 18,500.

[Nonlinear Polyester Resin Synthesis]

A nonlinear polyester resin (X2-3) was produced by carrying out the reaction in the same manner as in the case of (X2-1) in Example 1 except that 2 parts of dibutyltin oxide (M) was used as the polycondensation catalyst. After 3-hour reaction under reduced pressure (5 to 20 mm Hg), the acid value was 1.5.

(X2-3) had a TBT content of less than 0.01 ppm, a THF-insoluble matter content of 0%, an acid value of 39, a hydroxyl value of 18, a Tg of 68° C., a number average molecular weight of 3,900, and a peak top molecular weight of 12,400.

[Toner Binder Synthesis]

400 parts of (X1-3) and 600 parts of (X2-3) were melted and mixed together in a continuous kneader at a jacket temperature of 150° C. The residence time was 3 minutes. The melted resin was cooled to 30° C. in 2 minutes using a steel belt cooler, followed by grinding to give a toner binder (TB3) of the invention.

EXAMPLE 4

[Linear Polyester Resin Synthesis]

A linear polyester resin (X1-4) was produced by carrying out the reaction in the same manner as in the case of (X1-1) in Example 1 except that 2 parts of dioctyltin oxide was used as the polycondensation catalyst.

(X1-4) had a TBT content of less than 0.01 ppm, a THF-insoluble matter content of 0%, an acid value of 7, a hydroxyl value of 11, a Tg of 58° C., a number average molecular weight of 7,050, and a peak top molecular weight of 19,500.

[Nonlinear Polyester Resin Synthesis]

A nonlinear polyester resin (X2-4) was produced by carrying out the reaction in the same manner as in the case of (X2-1) in Example 1 except that 2 parts of monobutyltin oxide was used as the polycondensation catalyst.

(X2-4) had a TBT content of less than 0.01 ppm, a THF-insoluble matter content of 0%, an acid value of 36, a hydroxyl value of 18, a Tg of 69° C., a number average molecular weight of 3,830, and a peak top molecular weight of 12,200.

[Toner Binder Synthesis]

400 parts of (X1-4) and 600 parts of (X2-4) were melted and mixed together in a continuous kneader at a jacket temperature of 150° C. The residence time was 3 minutes. The melted resin was cooled to 30° C. in 4 minutes using a steel belt cooler, followed by grinding to give a toner binder (TB4) of the invention.

COMPARATIVE EXAMPLE 1-1

[Comparative Linear Polyester Resin Synthesis]

The reaction was carried out in the same manner as in the case of (X1-1) in Example 1 except that 2 parts of titanium tetrabutoxide was used as the polycondensation catalyst. But a problem arose. Namely, the reaction stopped halfway due to catalyst deactivation and no more byproduct water distilled off. Therefore, five 1.5-part portions of titanium tetrabutoxide were added during the procedure. However, it was impossible to drive the reaction until an acid value of 5; no desired polycondensate was obtained. The reaction mixture assumed a strong violet-brown color.

COMPARATIVE EXAMPLE 1-2

[Comparative Linear Polyester Resin Synthesis]

The reaction was carried out in the same manner as in the case of (X1-1) in Example 1 except that 2 parts of titanium tetraglycoxide was used as the polycondensation catalyst. The rate of reaction was slow, so that the reaction was continued at atmospheric pressure for 16 hours and then under reduced pressure for 8 hours to give a comparative linear polyester resin (CX1-1).

(CX1-1) occurred as a violet-brown resin, contained no THF-insoluble fraction, and had an acid value of 5, a hydroxyl value of 11, a Tg of 58° C., a number average molecular weight of 6,500, and a peak top molecular weight of 20,200.

[Comparative Nonlinear Polyester Resin Synthesis]

The reaction was carried out in the same manner as in the case of (X2-1) in Example 1 except that 2 parts of titanium tetraglycoxide was used as the polycondensation catalyst. But a problem arose. Namely, the reaction stopped halfway due to catalyst deactivation and no more byproduct water distilled off. Therefore, four 1.5-part portions of titanium tetraglycoxide were added during the procedure to give a comparative nonlinear polyester resin (CX2-1).

(CX2-1) occurred as a violet-brown resin, contained no THF-insoluble fraction, and had an acid value of 33, a hydroxyl value of 16, a Tg of 68° C., a number average molecular weight of 3,680, and a peak top molecular weight of 11,800.

[Comparative Toner Binder Synthesis]

400 parts of (CX1-1) and 600 parts of (CX2-1) were melted and mixed together in a continuous kneader at a jacket temperature of 150° C. The residence time was 3 minutes. The melted resin was cooled to 30° C. in 4 minutes using a steel belt cooler, followed by grinding to give a comparative toner binder (CTB1). (CTB1) was a resin having a strong violet-brown color.

COMPARATIVE EXAMPLE 2

[Comparative Linear Polyester Resin Synthesis]

A comparative linear polyester resin (CX1-2) was produced following the same reaction procedure as in the case of (X1-1) in Example 1 except that 0.2 parts of dibutyltin oxide (L) was used as the polycondensation catalyst. After 10-hour reaction at 220° C., the acid value was 25.

(CX1-2) had a TBT content of 0.08 ppm, a THF-insoluble matter content of 0%, an acid value of 15, a hydroxyl value of 27, a Tg of 57° C., a number average molecular weight of 4,300, and a peak top molecular weight of 11,500.

[Comparative Nonlinear Polyester Resin Synthesis]

A comparative nonlinear polyester resin (CX2-2) was produced following the same reaction procedure as in the case of (X2-1) in Example 1 except that 0.2 parts of dibutyltin oxide (P) was used as the polycondensation catalyst. After 3-hour reaction under reduced pressure (5 to 20 mm Hg), the acid value was 25.

(CX2-2) had a TBT content of 0.09 ppm, a THF-insoluble matter content of 0%, an acid value of 45, a hydroxyl value of 27, a Tg of 63° C., a number average molecular weight of 3,500, and a peak top molecular weight of 8,200.

[Comparative Toner Binder Synthesis]

A comparative toner binder (CTB2) was produced in the same manner as in Example 3 except that (CX1-2) was used in lieu of (X1-3) and (CX2-2) in lieu of (X2-3).

COMPARATIVE EXAMPLE 3

[Comparative Linear Polyester Resin Synthesis]

A comparative linear polyester resin (CX1-3) was produced following the same reaction procedure as in the case of (X1-1) in Example 1 except that 2 parts of dibutyltin oxide (L) was used as the polycondensation catalyst. After 10-hour reaction at 220° C., the acid value was 14.

(CX1-3) had a TBT content of 0.89 ppm, a THF-insoluble matter content of 0%, an acid value of 6, a hydroxyl value of 12, a Tg of 60° C., a number average molecular weight of 6,940, and a peak top molecular weight of 19,100.

[Comparative Nonlinear Polyester Resin Synthesis]

A comparative nonlinear polyester resin (CX2-3) was produced following the same reaction procedure as in the case of (X2-1) in Example 1 except that 2 parts of dibutyltin oxide (P) was used as the polycondensation catalyst. After 3-hour reaction under reduced pressure (5 to 20 mm Hg), the acid value was 1.6.

(CX2-3) had a TBT content of 0.97 ppm, a THF-insoluble matter content of 0%, an acid value of 40, a hydroxyl value of 19, a Tg of 68° C., a number average molecular weight of 3,760, and a peak top molecular weight of 11,950.

[Comparative Toner Binder Synthesis]

A comparative toner binder (CTB3) was produced in the same manner as in Example 3 except that (CX1-3) was used in lieu of (X1-3) and (CX2-3) in lieu of (X2-3).

EVALUATION EXAMPLES 1 TO 4 AND COMPARATIVE EVALUATION EXAMPLES 1 TO 3

For each of the toner binders (TB1) to (TB4) of the invention and the comparative toner binders (CTB1) to (CTB3), 100 parts of the toner binder was premixed with 5 parts of carnauba wax and 4 parts of a yellow pigment [toner yellow HG VP2155, product of Clariant] using a Henschel mixer [model FM10B, product of Mitsui Miike Kakoki], and the mixture was kneaded in a twin-screw kneader [model PCM-30, product of Ikegai Corp.]. The mixture was then finely pulverized using a supersonic jet pulverizer [Labojet, product of Nippon Pneumatic Mfg. Co.], followed by classification using an air classifier [model MDS-I, product of Nippon Pneumatic] to give toner particles with a particle diameter D50 of 8 μm. Then, 0.5 parts of colloidal silica [Aerosil R972, product of Nippon Aerosil] was admixed with 100 parts of the toner particles in a sample mill. In this way, toners (T1) to (T4) and comparative toners (CT1) to (CT3) were obtained.

The results of evaluations made by the following evaluation methods are shown in Table 1.

[Evaluation Methods]

(1) Gloss Appearance Temperature (GLOSS)

A two-component developer for the evaluation was prepared by uniformly mixing up 30 parts of each toner and 800 parts of a ferrite carrier (F-150; product of Powdertech Co.). Unfixed images developed on a commercial copier (AR 5030; product of Sharp Corp.) using the developer were fixed at a process speed of 120 mm/sec on a fixing machine prepared by modifying the fixing unit of a commercial printer (LBP 2160; product of Canon Inc.) so that the heated roller temperature might be varied. The fixing roll temperature at which the fixed image showed a 60° gloss of not less than 10% was determined using a commercial glossmeter (MURAKAMI COLOR RESEARCH LABORATORY model gmx-202-60) and recorded as the gloss appearance temperature.

(2) Hot Offset Occurrence Temperature (HOT)

Fixation was performed in the same manner as in the above-mentioned GLOSS evaluation, and the occurrence or nonoccurrence of hot offset onto fixed images was evaluated by the eye. The fixing roll temperature at which hot offset occurred was recorded as the hot offset occurrence temperature.

(3) Color Tone

Image fixation was performed on OHP films at a fixing roll temperature of 170° C. in the same manner as in the above-mentioned GLOSS evaluation, the fixed images were projected onto a screen using an overhead projector, and the color tone was judged by the eye.

Evaluation Criteria

"Good": Vivid yellow.
"Fair": Slightly blurred yellow.
"Poor": Blurred.

(4) Toner Flowability

The toners were measured for static bulk densities using a Hosokawa Micron's powder tester, and the flowability of each toner was evaluated according to the following criteria. When the flowability is "fair" or better, the toner is suited for practical use.

Static Bulk Density 36 g/100 ml or higher: toner flowability is "good"
33–36: Better level than "fair" but worse than "good"
30–33: "Fair"
27–30: Better level than "poor" but worse than "fair"
less than 27: "Poor"

(5) Staining of the Photoconductor

Each developer prepared as described above under (1) was conditioned in a low-temperature and low-humidity environment (10° C., 40% R.H.) for at least 8 hours. Using the developer and a commercial copier (AR 5030; product of Sharp Corp.) in the same environment, 3,000 copies were made, and the photoconductor was examined for staining and the copied images were checked for quality.

Evaluation Criteria

"Excellent": No photoconductor staining with the toner, and good image quality.

"Good": A slight amount of the toner adhering to the photoconductor but almost no deterioration (staining of white background) in image quality.

"Fair": A slight amount of the toner adhering to the photoconductor and image quality deterioration (staining of white background) observed.

"Poor": A significant amount of the toner adhering to the photoconductor, and marked image quality deterioration with white stripes crossing images in addition to staining of white background.

quality even under low-temperature and low-humidity conditions and are superior in color tone to the toners prepared from the conventional toner binders. Furthermore, it is evident that the polycondensation catalysts used in accordance with the invention are superior in catalytic activity to the known titanium-containing catalysts (titanium tetraglycoxide, titanium tetrabutoxide).

<Evaluation in the Form of a Monochrome Toner—1>

EXAMPLE 5

[Modified Polyester Resin Synthesis]

A reaction vessel equipped with a condenser, stirrer and nitrogen inlet tube was charged with 549 parts of bisphenol A-PO (2 moles) adduct, 20 parts of bisphenol A-PO (3 moles) adduct, 133 parts of bisphenol A-ethylene oxide (2 moles) adduct, 10 parts of phenol novolak (average degree of polymerization about 5)-EO (5 moles) adduct, 252 parts of terephthalic acid, 19 parts of isophthalic acid, 10 parts of trimellitic anhydride, and 2 parts of titanium acetylacetonate as a polycondensation catalyst, and the reaction was carried out under a nitrogen stream at 230° C. for 10 hours while distilling off the byproduct water. Then, the reaction was further allowed to proceed under reduced pressure (5 to 20 mm Hg) until the acid value reached not more than 2. Then, 50 parts of trimellitic anhydride was added, the reaction was allowed to proceed at ordinary pressure for 1 hour and then under reduced pressure (20 to 40 mm Hg) When the softening point arrived at 105° C., 20 parts of bisphenol A diglycidyl ether was added. When a softening point of 150° C. was attained, the product was taken out, cooled to room temperature, and ground to give a modified polyester resin (Y1-1).

(Y1-1) had a softening point of 150° C., an acid value of 53, a hydroxyl value of 17, a Tg of 74° C., a number average molecular weight of 1,800, a peak top molecular weight of 6,700, and a THF-insoluble matter content of 33%. This was used as a toner binder (TB5).

EXAMPLE 6

[Modified Polyester Resin Synthesis]

A modified polyester resin (Y1-2) was produced by carrying out the reaction in the same manner as in the case of (Y1-1) in Example 5 except that 2 parts of potassium titanyl maleate was used as the polycondensation catalyst, followed by taking out at a softening point of 150° C., cooling to room temperature and grinding.

TABLE 1

|  | Toner | GLOSS (° C.) | HOT (° C.) | Color tone | Flowability | Staining of the photoconductor | TBT content |
|---|---|---|---|---|---|---|---|
| Evaluation Example 1 | (T1) | 130 | >200 | Good | Good | Excellent | — |
| Evaluation Example 2 | (T2) | 130 | >200 | Good | Good | Excellent | — |
| Evaluation Example 3 | (T3) | 130 | >200 | Good | Good | Good | <0.01 ppm |
| Evaluation Example 4 | (T4) | 130 | >200 | Good | Good | Good | <0.01 ppm |
| Compar. Evaluation Example 1 | (CT1) | 128 | >200 | Poor | Poor | Good | — |
| Compar. Evaluation Example 2 | (CT2) | 130 | 145 | Fair | Poor | Poor | 0.07 ppm |
| Compar. Evaluation Example 3 | (CT3) | 135 | >200 | Good | Good | Poor | 0.84 ppm |

From Table 1, it is apparent that the toners prepared by using the toner binders of the invention ensure stable image (Y1-2) had a softening point of 150° C., an acid value of 51, a hydroxyl value of 16, a Tg of 74° C., a number average molecular weight of 1,940, a peak top molecular weight of 6,630, and a THF-insoluble matter content of 35%. This was used as a toner binder (TB6).

EXAMPLE 7

[Nonlinear Polyester Resin Synthesis]

A reaction vessel equipped with a condenser, stirrer and nitrogen inlet tube was charged with 132 parts of bisphenol A-PO (2 moles) adduct, 371 parts of bisphenol A-PO (3 moles) adduct, 20 parts of bisphenol A-EO (2 moles) adduct, 125 parts of phenol novolak (average degree of polymerization about 5)-PO (5 moles) adduct, 201 parts of terephthalic acid, 25 parts of maleic anhydride, 35 parts of dimethyl terephthalate, and 1.5 parts of potassium titanyl oxalate as a polycondensation catalyst, and the reaction was carried out under a nitrogen stream at 230° C. for 10 hours while distilling off the byproduct water. Then, the reaction was further allowed to proceed under reduced pressure (5 to 20 mm Hg). When the acid value became not more than 2, the reaction mixture was cooled to 180° C. and 65 parts of trimellitic anhydride was added. The reaction was allowed to proceed at ordinary pressure in a tightly closed condition for 2 hours, and the reaction mixture was then taken out, cooled to room temperature, and ground to give a nonlinear polyester resin (X2-5).

The nonlinear polyester resin (X2-5) had a softening point of 142° C., an acid value of 30, a hydroxyl value of 17, a Tg of 57° C., a number average molecular weight of 1,380, a peak top molecular weight of 4,150, and a THF-insoluble matter content of 26%. This was used as a toner binder (TB7)

EXAMPLE 8

[Nonlinear Polyester Resin Synthesis]

A reaction vessel equipped with a condenser, stirrer and nitrogen inlet tube was charged with 410 parts of bisphenol A-PO (2 moles) adduct, 270 parts of bisphenol A-PO (3 moles) adduct, 110 parts of terephthalic acid, 125 parts of isophthalic acid, 15 parts of maleic anhydride, and 2 parts of potassium titanyl oxalate as a polycondensation catalyst, and the reaction was carried out under a nitrogen stream at 220° C. for 10 hours while distilling off the byproduct water. Then, the reaction was further allowed to proceed under reduced pressure (5 to 20 mm Hg). When the acid value became not more than 2, the reaction mixture was cooled to 180° C. and 25 parts of trimellitic anhydride was added. The reaction was allowed to proceed at ordinary pressure in a tightly closed condition for 2 hours and, then, the product was taken out, cooled to room temperature, and ground to give a nonlinear polyester resin (X2-6).

(X2-6) contained no THF-insoluble matter, and had an acid value of 18, a hydroxyl value of 35, a Tg of 61° C., a number average molecular weight of 1,990, and a peak top molecular weight of 5,310.

[Modified Polyester Resin Synthesis]

A reaction vessel equipped with a condenser, stirrer and nitrogen inlet tube was charged with 317 parts of bisphenol A-EO (2 moles) adduct, 57 parts of bisphenol A-PO (2 moles) adduct, 298 parts of bisphenol A-PO (3 moles) adduct, 75 parts of phenol novolak (average degree of polymerization about 5)-PO (5 moles) adduct, 30 parts of isophthalic acid, 157 parts of terephthalic acid, 27 parts of maleic anhydride, and 1.5 parts of potassium titanyl oxalate as a polycondensation catalyst, and the reaction was carried out under a nitrogen stream at 230° C. for 10 hours while distilling off the byproduct water. Then, the reaction was further allowed to proceed under reduced pressure (5 to 20 mm Hg) and, when the acid value became not more than 2, the reaction mixture was cooled to 180° C. Then, 68 parts of trimellitic anhydride was added, the reaction was allowed to proceed at ordinary pressure for 1 hour and then under reduced pressure (20 to 40 mm Hg). When the softening point arrived at 120° C., 25 parts of bisphenol A diglycidyl ether was added. When a softening point of 155° C. was attained, the product was taken out, cooled to room temperature, and ground to give a modified polyester resin (Y1-3).

(Y1-3) had a softening point of 155° C., an acid value of 10, a hydroxyl value of 29, a Tg of 58° C., a number average molecular weight of 3,120, a peak top molecular weight of 6,130, and a THF-insoluble matter content of 36%.

[Toner Binder Synthesis]

500 parts of (X2-6) and 500 parts of (Y1-3) were melted and mixed together in a continuous kneader at a jacket temperature of 150° C. The residence time was 3 minutes. The melted resin was cooled to 30° C. in 4 minutes using a steel belt cooler, followed by grinding to give a toner binder (TB8) according to the invention.

EXAMPLE 9

[Nonlinear Polyester Resin Synthesis]

A nonlinear polyester resin (X2-7) was produced by carrying out the reaction in the same manner as in the case of (X2-6) in Example 8 except that 2 parts of titanium terephthalate was used as the polycondensation catalyst, followed by cooling to room temperature and grinding.

(X2-7) contained no THF-insoluble matter, and had an acid value of 17, a hydroxyl value of 35, a Tg of 61° C., a number average molecular weight of 2,110, and a peak top molecular weight of 5,450.

[Modified Polyester Resin Synthesis]

A modified polyester resin (Y1-4) was produced by carrying out the reaction in the same manner as in the case of (Y1-3) in Example 8 except that 1.5 parts of titanium terephthalate was used as the polycondensation catalyst, followed by cooling to room temperature and grinding.

(Y1-4) had a softening point of 155° C., an acid value of 9, a hydroxyl value of 28, a Tg of 59° C., a number average molecular weight of 3,050, a peak top molecular weight of 6,010, and a THF-insoluble matter content of 38%.

[Toner Binder Synthesis]

500 parts of the polyester (X2-7) and 500 parts of the polyester (Y1-4) were subjected to powder mixing in a Henschel mixer for 5 minutes to give a toner binder resin (TB9) according to the invention.

EXAMPLE 10

[Modified Polyester Resin Synthesis]

The reaction was carried out in the same manner as in the case of (Y1-1) in Example 5 except that 2 parts of dibutyltin oxide (N) was used as the polycondensation catalyst. The product was taken out at a softening point of 145° C., cooled to room temperature, and ground to give a modified polyester resin (Y1-5).

(Y1-5) had a TBT content of less than 0.01 ppm, a softening point of 151° C., an acid value of 54, a hydroxyl value of 17, a Tg of 73° C., a number average molecular weight of 2,100, a peak top molecular weight of 6,500, and a THF-insoluble matter content of 34%. This was used as a toner binder (TB10)

EXAMPLE 11

[Nonlinear Polyester Resin Synthesis]

A nonlinear polyester resin (X2-8) was produced by carrying out the reaction in the same manner as in the case of (X2-6) in Example 8 except that 2 parts of dibutyltin oxide (N) was used as the polycondensation catalyst, followed by cooling to room temperature and grinding.

(X2-8) had a TBT content of less than 0.01 ppm, contained no THF-insoluble matter, and had an acid value of 18, a hydroxyl value of 33, a Tg of 62° C., a number average molecular weight of 2,100, and a peak top molecular weight of 5,400.

[Modified Polyester Resin Synthesis]

The reaction was carried out in the same manner as in the case of (Y1-3) in Example 8 except that 2 parts of dibutyltin oxide (O) was used as the polycondensation catalyst. The product was taken out at a softening point of 148° C., cooled to room temperature, and ground to give a modified polyester resin (Y1-6).

(Y1-6) had a TBT content of 0.13 ppm, a softening point of 153° C., an acid value of 9, a hydroxyl value of 31, a Tg of 58° C., a number average molecular weight of 3,100, a peak top molecular weight of 6,100, and a THF-insoluble matter content of 33%.

[Toner Binder Synthesis]

500 parts of (X2-8) and 500 parts of (Y1-6) were melted and mixed together in a continuous kneader at a jacket temperature of 150° C. The residence time was 3 minutes. The melted resin was cooled to 30° C. in 4 minutes using a steel belt cooler, followed by grinding to give a toner binder (TB11) according to the invention.

COMPARATIVE EXAMPLE 4

[Comparative Modified Polyester Resin Synthesis]

A comparative modified polyester resin (CY-1) was produced by carrying out the reaction in the same manner as in the case of (Y1-1) in Example 5 except that 2 parts of dibutyltin oxide (P) was used as the polycondensation catalyst.

(CY-1) had a TBT content of 0.91 ppm, a softening point of 150° C., an acid value of 54, a hydroxyl value of 16, a Tg of 74° C., a number average molecular weight of 1,820, and a peak top molecular weight of 6,600, and a THF-insoluble matter content of 34%. This was used as a toner binder (CTB4)

EVALUATION EXAMPLES 5 TO 11 AND COMPARATIVE EVALUATION EXAMPLE 4

For each of the toner binders (TB5) to (TB11) according to the invention and the comparative toner binder (CTB4), 100 parts of the toner binder was premixed with 8 parts of carbon black MA-100 (product of Mitsubishi Chemical), 5 parts of carnauba wax and 1 part of the charge control agent T-77 (product of Hodogaya Chemical) using a Henschel mixer [model FM10B, product of Mitsui Miike Kakoki], and the mixture was kneaded in a twin-screw kneader [model PCM-30, product of Ikegai Corp.].

The mixture was then finely pulverized using a supersonic jet pulverizer [Labojet, product of Nippon Pneumatic Mfg. Co.], followed by classification using an air classifier [model MDS-I, product of Nippon Pneumatic] to give toner particles with a particle diameter D50 of 9 μm. Then, 0.3 parts of colloidal silica [Aerosil R972, product of Nippon Aerosil] was admixed with 100 parts of the toner particles in a sample mill. In this way, toners (T5) to (T11) and a comparative toner (CT4) were obtained.

The results of evaluations made by the following evaluation methods are shown in Table 2.

[Evaluation Methods]

(1) Minimal Fixing Temperature (MFT)

A two-component developer for the evaluation was prepared by uniformly mixing up 30 parts of each toner and 800 parts of a ferrite carrier (F-150; product of Powdertech Co.). Unfixed images developed on a commercial copier (AR 5030; product of Sharp Corp.) using the developer were fixed at a process speed of 145 mm/sec on a fixing machine prepared by modifying the fixing unit of a commercial copier (SF 8400A; product of Sharp) so that the heated roller temperature might be varied. The fixing roll temperature at which the residual image density after rubbing of the fixed image with a pad amounted to at least 70% was recorded as the minimal fixing temperature.

(2) Hot Offset Occurrence Temperature (HOT)

Fixation was performed in the same manner as in the above-mentioned MFT evaluation, and the occurrence or nonoccurrence of hot offset onto fixed images was evaluated by the eye. The fixing roll temperature at which hot offset occurred was recorded as the hot offset occurrence temperature.

(3) Pigment Dispersibility

Each toner was measured for dielectric loss tangent (tan δ), and this was employed as an indicator of pigment dispersibility.

Evaluation Criteria

"Good": tan δ: not more than 10

"Fair": tan δ: from 10 to 30

"Poor": tan δ: not less than 30

Dielectric Loss Tangent Measurement Conditions

Apparatus: Ando Electric Company model TR-1100 dielectric loss measuring apparatus Electrodes: Ando Electric Company model SE-43 powder electrodes Measurement frequency: 1 kHz (4) Staining of the Photoconductor Each developer prepared as described above under (1) was conditioned in a low-temperature and low-humidity environment (10° C., 40% R.H.) for at least 8 hours. Using the developer and a commercial copier (AR 5030; product of Sharp Corp.) in the same environment, 3,000 copies were made, and the photoconductor was examined for staining and the copied images were checked for quality.

Evaluation Criteria

"Excellent": No photoconductor staining with the toner, and good image quality.

"Good": A slight amount of the toner adhering to the photoconductor but almost no deterioration (staining of white background) in image quality.

"Fair": A slight amount of the toner adhering to the photoconductor and image quality deterioration (staining of white background) observed.

"Poor": A significant amount of the toner adhering to the photoconductor, and marked image quality deterioration with white stripes crossing images in addition to staining of white background.

TABLE 2

| | Toner | MFT (° C.) | HOT (° C.) | Pigment dispersibility | Staining of the photoconductor | TBT content |
|---|---|---|---|---|---|---|
| Evaluation Example 5 | (T5) | 140 | 225 | Good | Good | — |
| Evaluation Example 6 | (T6) | 140 | 230 | Good | Good | — |
| Evaluation Example 7 | (T7) | 135 | 225 | Good | Excellent | — |
| Evaluation Example 8 | (T8) | 130 | 230 | Good | Excellent | — |
| Evaluation Example 9 | (T9) | 130 | 230 | Good | Excellent | — |
| Evaluation Example 10 | (T10) | 135 | 225 | Good | Good | <0.01 ppm |
| Evaluation Example 11 | (T11) | 135 | 225 | Good | Good | 0.05 ppm |
| Compar. Evaluation Example 4 | (CT4) | 140 | 225 | Good | Fair | 0.82 ppm |

From Table 2, it is seen that the toners prepared by using the toner binders of the invention ensure stable image quality even under low-temperature and low-humidity conditions and are comparable or superior in fixation characteristics and pigment dispersibility to the toners prepared from the conventional toner binders.

<Evaluation in the Form of a Monochrome Toner—2>

EXAMPLE 12

[Modified Polyester Resin Synthesis]

A modified polyester resin (Y1-7) was produced following the reaction procedure for (Y1-1) in Example 5 except that 2 parts of monobutyltin oxide was used as the polycondensation catalyst.

(Y1-7) had an acid value of 54, a hydroxyl value of 17, a Tg of 74° C., a number average molecular weight of 1,850, a peak top molecular weight of 6,750, a THF-insoluble matter content of 33%, and a TBT content of less than 0.01 ppm. This was used as a toner binder (TB12).

EXAMPLE 13

[Nonlinear Polyester Resin Synthesis]

A nonlinear polyester resin (X2-9) was produced following the same reaction procedure as for (X2-5) in Example 7 except that 2 parts of dioctyltin oxide was used as the polycondensation catalyst.

(X2-9) had a softening point of 145° C., an acid value of 28, a hydroxyl value of 16, a Tg of 58° C., a number average molecular weight of 1,480, a THF-insoluble matter content of 26%, and a TBT content of less than 0.01 ppm. This was used as a toner binder (TB13).

EXAMPLE 14

[Nonlinear Polyester Resin Synthesis]

A nonlinear polyester resin (X2-10) was produced following the same reaction procedure as for (X2-6) in Example 8 except that 2 parts of monobutyltin oxide was used as the polycondensation catalyst.

(X2-10) contained no THF-insoluble fraction, and had an acid value of 18, a hydroxyl value of 34, a Tg of 61° C., a number average molecular weight of 2,010, a peak molecular weight of 5,450, and a TBT content of less than 0.01 ppm.

[Modified Polyester Resin Synthesis]

A modified polyester resin (Y1-8) was produced following the same reaction procedure as for (Y1-3) in Example 8 except that 2.5 parts of dioctyltin oxide was used as the polycondensation catalyst.

(Y1-8) had an acid value of 11, a hydroxyl value of 29, a Tg of 58° C., a number average molecular weight of 3,150, a peak top molecular weight of 6,050, a THF-insoluble matter content of 34%, and a TBT content of less than 0.01 ppm.

[Toner Binder Synthesis]

500 parts of (X2-10), 500 parts of (Y1-8) and 50 parts of a Fischer-Tropsch wax (Paraflint H1) were melted and mixed together in a continuous kneader at a jacket temperature of 150° C. the residence time was 3 minutes. The melted resin was cooled to 30° C. in 4 minutes using a steel belt cooler, followed by grinding to give a toner binder (TB14) according to the invention.

COMPARATIVE EXAMPLE 5

[Comparative Nonlinear Polyester Resin Synthesis]

The same reaction procedure as for (X2-5) in Example 7 was carried out except that 2 parts of titanium tetraglycoxide was used as the polycondensation catalyst. Since the rate of reaction was slow, the reaction was carried out at atmospheric pressure for 16 hours and then under reduced pressure for 18 hours. The acid value was 6, however. After cooling to 180° C., 65 parts of trimellitic anhydride was added, and the reaction was further allowed to proceed at ordinary pressure in a tightly closed condition for 2 hours. Then the reaction mixture was taken out, cooled to room temperature, and ground to give a comparative nonlinear polyester resin (CX2-4).

(CX2-4) had a softening point of 131° C., an acid value of 33, a hydroxyl value of 22, a Tg of 51° C., a number average molecular weight of 1,250, a peak top molecular weight of 3,570, and a THF-insoluble matter content of 17%. This was used as a comparative toner binder (CTB5).

EVALUATION EXAMPLES 12 AND 13 AND COMPARATIVE EVALUATION EXAMPLE 5

For each of the toner binders (TB12) and (TB13) according to the invention and the comparative toner binder (CTB5), 100 parts of the toner binder was premixed with 8 parts of carbon black MA-100 [product of Mitsubishi Chemical], 5 parts of a Fischer-Tropsch wax [Paraflint H1] and 1 part of the charge control agent T-77 [product of Hodogaya Chemical] using a Henschel mixer [model FM10B, product of Mitsui Miike Kakoki], and the mixture was kneaded in a twin-screw kneader [model PCM-30, product of Ikegai Corp.]. The mixture was then finely pulverized using a supersonic jet pulverizer [Labojet, product of Nippon Pneumatic Mfg. Co.], followed by classification using an air classifier [model MDS-I, product of Nippon Pneumatic] to give toner particles with a particle diameter D50 of 9 μm. Then, 0.3 parts of colloidal silica [Aerosil R972, product of Nippon Aerosil] was admixed with 100 parts of the toner particles in a sample mill. In this way, toners (T12) and (T13) and a comparative toner (CT5) were obtained.

EVALUATION EXAMPLE 14

A toner (T14) was prepared using the toner binder (TB14) according to the invention in the same manner as in Evaluation Example 12 except that the Fischer-Tropsch wax was not added.

The results of evaluations of (T12) to (T14) and (CT5) by the evaluation methods mentioned above are shown in Table 3.

TABLE 3

| | Toner | MFT (° C.) | HOT (° C.) | Pigment dispersibility | Staining of the photoconductor | TBT content |
|---|---|---|---|---|---|---|
| Evaluation Example 12 | (T12) | 140 | ^230 | Good | Good | <0.01 ppm |
| Evaluation Example 13 | (T13) | 135 | 225 | Good | Good | <0.01 ppm |
| Evaluation Example 14 | (T14) | 130 | 225 | Good | Good | <0.01 ppm |
| Compar. Evaluation Example 5 | (CT5) | 135 | 150 | Poor | Fair | — |

From Table 3, it is seen that the toners prepared by using the toner binders according to the invention ensure stable image quality even under low-temperature and low-humidity conditions and, further, are excellent in hot offset resistance and pigment dispersibility.

INDUSTRIAL APPLICABILITY

The toner binders of the invention have the following effects.
1. They ensure stable image quality even under low-temperature and low-humidity conditions.
2. They are excellent in both low temperature fixability and hot offset resistance.
3. They are less discolored and, when made into color toners, they ensure a good tone of color.
4. They are excellent in flowability and pigment dispersibility, and in charging characteristics.
5. They are produced by using a catalyst which does not contain any tributyltin compound suspected of being an endocrine disrupter or contains such compound only in a trace amount, hence they exert only a slight influence upon the environment.

The invention claimed is:

1. A toner for developing electrostatic charge images, which comprises at least a toner binder and a colorant, said toner binder being a polycondensate polyester resin formed in the presence of at least one titanium-containing catalyst (A) selected from the group consisting of a titanium halides (A1), a titanium diketone enolate (A2), a titanium carboxylate (A3), a titanyl carboxylate (A4) and a titanyl carboxylate salt (A5).

2. The toner for developing electrostatic charge images according to claim 1
wherein the titanium diketone enolate (A2) is titanium acetylacetonate.

3. The toner for developing electrostatic charge images according to claim 1
wherein the titanium carboxylate (A3) is an aromatic carboxylic acid titanium salt.

4. The toner for developing electrostatic charge images according to claim 1
wherein the titanyl carboxylate salt (A5) is a titanyl maleate salt or a titanyl oxalate salt.

5. A toner for developing electrostatic charge images, which comprises at least a toner binder and a colorant, said toner binder being a polycondensate polyester resin formed in the presence of at least one tin-containing catalyst (B) selected from the group consisting of dioctyltin oxide (B1), monobutyltin oxide (B2), and dibutyltin oxide (B3), with the content of tributyltin compounds in (B3) being not more than 250 ppm.

6. The toner for developing electrostatic charge images according to claim 5,
wherein the tin-containing catalyst (B) is monobutyltin oxide (B2) or dibutyltin oxide (B3), and
the content of tributyltin compounds in said polyester resin is not more than 0.6 ppm.

7. The toner for developing electrostatic charge images according to claim 1,
wherein at least a part of the polyester resin being modified with a polyepoxide (C).

8. The toner for developing electrostatic charge images according to claim 5,
wherein at least a part of the polyester resin being modified with a polyepoxide (C).

9. A toner binder for developing electrostatic charge images
which binder comprises a polycondensate polyester resin,
said polyester resin being a product formed in the presence of at least one titanium-containing catalyst (A) selected from the group consisting of a titanium halides (A1) and a titanium carboxylate (A3).

10. A toner binder for developing electrostatic charge images
which binder comprises a polycondensate polyester resin, said polyester resin being a product formed in the presence of at least one titanium-containing catalyst (A) selected from the group consisting of a titanium halides (A1), a titanium diketone enolate (A2), a titanium carboxylate (A3), a titanyl carboxylate (A4) and a titanyl carboxylate salt (A5), and which binder further comprises at least one mold release agent selected from the group consisting of carnauba waxes, Fischer-Tropsch waxes, paraffin waxes and polyolefin waxes.

11. A toner binder for developing electrostatic charge images which binder comprises a polycondensate polyester resin, said polyester resin being a product formed in the presence of at least one titanium-containing catalyst (A) selected from the group consisting of a titanium halides (A1), a titanium diketone enolate (A2), a titanium carboxylate (A3), a titanyl carboxylate (A4) and a titanyl carboxylate salt (A5), and which binder further comprises a charge control agent.

12. A toner binder for developing electrostatic charge images, which binder comprises a polycondensate polyester resin, said polyester resin being a product formed in the presence of at least one tin-containing catalyst (B) selected from the group consisting of dioctyltin oxide (B1), monobutyltin oxide (B2), and dibutyltin oxide (B3), with the content of tributyltin compounds in (B3) being not more than 250 ppm.

13. The toner binder for developing electrostatic charge images according to claim 12, which further comprises at least one mold release agent selected from the group consisting of carnauba waxes, Fischer-Tropsch waxes, paraffin waxes and polyolefin waxes.

14. The toner binder for developing electrostatic charge images according to claim 12, which further comprises a charge control agent.

* * * * *